(12) United States Patent
Smith et al.

(10) Patent No.: US 6,611,686 B1
(45) Date of Patent: Aug. 26, 2003

(54) TRACKING CONTROL AND LOGISTICS SYSTEM AND METHOD

(75) Inventors: Joseph D. Smith, Freeport, TX (US); Austin L. Higgs, Lake Jackson, TX (US); Thien K. Nguyen, Freeport, TX (US)

(73) Assignee: Elite Logistics Services, Inc., Freeport, TX (US)

( * ) Notice: Subject to any disclaimer, the term of this patent is extended or adjusted under 35 U.S.C. 154(b) by 0 days.

(21) Appl. No.: 09/317,388

(22) Filed: May 24, 1999

Related U.S. Application Data

(60) Provisional application No. 60/119,378, filed on Feb. 9, 1999, and provisional application No. 60/125,658, filed on Mar. 22, 1999.

(51) Int. Cl.[7] .......................... H04Q 7/20; G08B 23/00
(52) U.S. Cl. ....................................... 455/456; 340/989
(58) Field of Search ................................ 455/440, 441, 455/456, 457, 458, 459, 31.3; 340/573, 5.5, 539, 693.5, 825.49, 38, 988, 933, 989

(56) References Cited

U.S. PATENT DOCUMENTS

| | | | |
|---|---|---|---|
| 4,997,053 A | | 3/1991 | Drori et al. |
| 5,043,736 A | | 8/1991 | Darnell et al. |
| 5,132,551 A | | 7/1992 | Carlo et al. |
| 5,224,567 A | | 7/1993 | Tomlinson |
| 5,370,201 A | | 12/1994 | Inubushi |
| 5,418,537 A | * | 5/1995 | Bird ............................ 342/357 |
| 5,448,218 A | | 9/1995 | Espinosa |
| 5,490,200 A | | 2/1996 | Snyder et al. |
| 5,588,038 A | | 12/1996 | Snyder |
| 5,777,580 A | * | 7/1998 | Janky et al. ................. 342/457 |
| 5,819,869 A | | 10/1998 | Horton |
| 6,072,396 A | * | 6/2000 | Gaukel ...................... 340/573.4 |
| 6,131,067 A | | 10/2000 | Girerd et al. |
| 6,172,641 B1 | | 1/2001 | Millington |
| 6,297,768 B1 | * | 10/2001 | Allen, Jr. .................. 342/357.1 |

OTHER PUBLICATIONS

U.S. patent application Ser. No. 09/206,627, Alvin, filed Dec. 7, 1998.

(List continued on next page.)

Primary Examiner—Edward F. Urban
Assistant Examiner—S. Smith
(74) Attorney, Agent, or Firm—Kenneth L. Nash

(57) ABSTRACT

A system, apparatus, and method are disclosed for monitoring, tracking, and logistics purposes that preferably includes a monitoring unit wherein data is processed using a microcontroller. The monitoring unit includes an interface with the target or asset to be tracked such that electrical signals may be sent between the target and monitoring unit to denote events from the target, e.g., air bag deployment and for activating features of the target, e.g., an alarm. The interface may be unique for each monitoring unit because unique information relating to each interface is stored in the system database, e.g., data may be related to a temperature in one unit and to a movement sensor indication in another. Therefore, the system may respond appropriately to signals having unique meanings from each different monitoring unit. A pager unit with a pager modem is controlled by the microcontroller to thereby encode the signals for transmission. A pager transmitter/receiver network is used for sending and receiving messages from the monitoring unit. The pager transmitter/receiver network is in communication with a server and the database. The server may be accessed by multiple clients over the Internet or other lines of communication so that the clients at numerous different remote locations may activate controls on their respective one or more remote targets/assets, find the locations thereof, and receive cumulative status reports.

45 Claims, 6 Drawing Sheets

OTHER PUBLICATIONS

Brochure for Motorola Series 500 Integrated Wireless Modems; 24000 35$^{th}$ Avenue SE, Suite 100, Bothell, WA 98021; phone: 425–489–5731.

Internet Advertisement for Synergy Systems entitled "Synergy Systems Tech–Note"; P.O. Box 262250, San Diego, CA 92196; phone: (619) 566–0666.

Spring 1998 Catalog for Motorola ONCORE™ GPS Products, P.O. Box 262250, San Diego Zip Code 92196, Tel: (619) 566–0666 Web Site: www.synergy-gps.com.

1998–99 Equipment, Software & Book Catalog from Navtech GPS Supply & Seminars entitled "Solutions for GPS Professionals"; 6121 Lincolnia Rd., Suite 400, Alexandria, VA 22312–2707.

User's Guide to Motorola entitled "Host Evaluation Board for the Series 505sd Integrated Wireless Modem" Motorola Company.

Internet Brochure for Series 500 Modems; Motorola Data Subscriber Products, 1–800–934–4721.

* cited by examiner

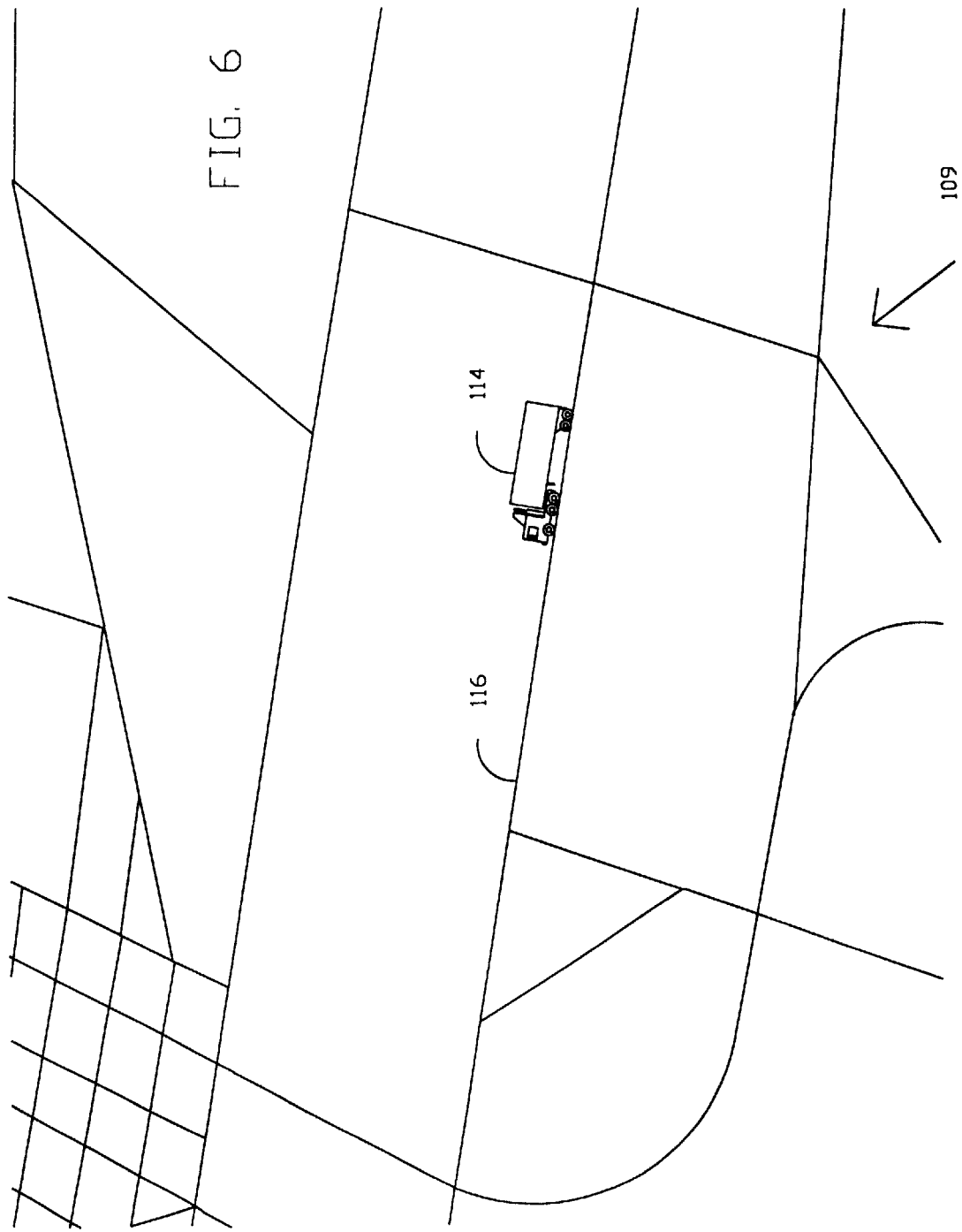

TRACKING CONTROL AND LOGISTICS SYSTEM AND METHOD

This application claims benefit of U.S. Provisional Application No. 60/119,378 filed Feb. 9, 1999 and U.S. Provisional Application No. 60/125,658 filed Mar. 22, 1999.

BACKGROUND OF THE INVENTION

1. Field of the Invention

The present invention relates generally to remote tracking, control, and logistics and, more particularly, to apparatus, systems and methods for remotely controlling one or more devices and/or remotely tracking one or more assets such as cars, trucks, ships, cargo, and the like.

2. Description of the Background

For the most part, it is expensive and difficult to monitor moveable assets such as cargo, vehicles, trucks, cargo containers, and the like. It would be desirable to provide a low cost, reliable device with the ability to locate assets anywhere and anytime. It would also be desirable to communicate between the asset and a central control center using any type of required data or information. Moreover, it would be desirable to enable the remote control center or a client at any location to initiate command and control functions to the assets or targets which may also be at any location in the world. The advantages of such a system would include the availability of near real time information and data which in turn would allow for maximum asset utilization and control at a greatly reduced cost of operation. An affordable device of this type would place proper equipment and materials at the right location during an upset condition response and allow real time monitoring of those assets.

As only one example, it would be desirable to remotely monitor the location of a vehicle in a cost-effective manner. Presently existing systems can achieve this function but the costs are prohibitive for general usage. The presently available lowest cost systems use a global positioning satellite system (GPS) sensor in conjunction with a cellular telephone-based modem. As is well known, the GPS sensor communicates with satellites to obtain location information for the sensor. A computer control interfaces between the vehicle inputs and outputs, the GPS sensor, and the cellular modem in accord with demands of the interface/software control between the cellular modem and cellular telephone. While these systems are able to some degree to perform the desired functions discussed above, the equipment costs of such systems are prohibitive for general usage. On top of the very high initial equipment cost, the supporting operating service cost is quite high. It would be desirable to provide a system capable of the same and additional functions that costs a fraction of presently available systems both for initial equipment costs and for operating service cost. In this way, the useful features of such systems could be effectively utilized in a great many applications such as affordable auto tracking and control as well as for many other purposes.

Consequently, there remains a need for a system and method for remote tracking, control, and logistics that is available at greatly reduced levels of capital investment as compared to systems available today as well as being operable for a fraction of the operating costs of present systems so as to be widely affordable. Those skilled in the art have long sought and will appreciate the present invention which addresses these and other problems.

SUMMARY OF THE INVENTION

The present invention provides a device which costs a fraction of presently available devices and also operates at a fraction of the cost of presently available services that allow for monitoring, controlling, and logistics. The device and system of the present invention permits usage on a wide scale due to its low cost. A wide range of targets or assets can be monitored by the present invention including but not limited to vehicles, trains, cargo, ships, persons, utility units, buildings, and other targets.

For this purpose, one preferred embodiment of the monitoring device for monitoring a target comprises a microcontroller programmed for operating the monitoring device. A pager controlled by the microcontroller is operable for communicating with a pager network. A pager modem is provided for interfacing with the pager for communicating over the pager network. A global positioning sensor is included for providing location information. An interface is provided between the monitoring device and the target for communicating signals relating to the target.

Preferably, a computer port is provided for connecting the monitoring device to a computer to allow communication between the computer and the pager network. In this way, the pager modem and the microcontroller is operable for sending email messages over the pager network. The pager is preferably operable for both sending and receiving signals over the pager network. A plurality of inputs to the monitoring device from the target are provided as well as plurality of outputs from the monitoring device to the target. If the target is a vehicle, then the interface communicates electrical signals relating to one or more elements of the vehicle.

The microcontroller is programmed in a low level language closely related to an architecture of the microcontroller. The low level programming language provides that the microcontroller is programmed to collect data from the global positioning sensor, send data through the modem, receive messages from the modem and communicate with the interface or with the global positioning sensor in response to the messages. As a security precaution, the microcontroller preferably has no port that allows access for reading the program.

In one embodiment of the invention for use with non-moving targets such as utility meters, home or building security, offshore platform, well pumps, or any other fixed structure or device and/or for moving devices where location information is not desired, the GPS is removed from the monitoring device. The programming allows the device to continue to operate with respect to other features.

The preferred system of the invention includes a pager network operable for communication with a plurality of pagers. In one embodiment, an Internet connection is provided for communication with the pager network. One or more computers having an Internet connection are operable for communicating over the Internet connection to detect the target signals. Preferably, the one or more computers are operable for sending a target control signal through the Internet connection for controlling one or more features of the target.

Where the monitor includes a GPS, then the one or more computers is operable for communicating over the computer connection through the pager network to determine a location of the respective target. For this purpose, a server is provided in communication with the pager network, and one or more computers are operable for communicating over the server and through the pager modem to detect the one or more target signals.

Preferably a database is provided for storing signals relating to the target either for communication with the one or more computers. The database also preferably provides information about each target and the definition/response for each target signal.

In the method of the invention, a pager with a pager antenna is attached to the target. An electrical interface is provided for the target such that one or more electrical signals may be received from the target through the electrical interface. Encoding of a message to a pager modem to form a modem-encoded message relating to the one or more electrical signals from the target is provided using a microcontroller in combination with the electrical interface, the pager modem, and the pager with a microcontroller. The modem-encoded message is transmitted through the pager using the pager antenna.

Preferably the microcontroller repeatedly checks the electrical interface for the one or more electrical signals from the target. A message may be transmitted from a pager network to the pager, received through the pager modem, and result in execution of a command responsive to the message. In another case, a global position may be determined and a message encoded to a pager modem to form a global position message based on the global position. The global position message is transmitted through the pager using the pager antenna. The global position message is received through a pager network and in a database. Remote access is provided to the database, such as access over an Internet connection. If the target is a vehicle, then the one or more electrical signals relate to the vehicle. On the other hand the target may be a structure affixed to the Earth so as to be non-moveable. One function of the invention allows for remotely operating the module for enforcing a loan related to the vehicle. It is also possible to remotely operate the module for determining that the vehicle stays within a selectable region.

Preferably, a monitoring system is provided for monitoring a plurality of targets on behalf of a plurality of respective clients in accord with the invention that comprises a computer network server operable for communicating with a plurality of client computers. In this embodiment, a database is operable for storing information relating to each of the plurality of targets. A first wireless network system is operable for communicating wirelessly with a plurality of pagers. The network server is in communication with the pager network system. A plurality of wireless communication units is provided for each of the plurality of targets wherein each of the plurality of wireless communication units is operable for communication with the wireless network. Preferably, each of the plurality of wireless communication units includes a global position sensor to provide location information for each of the plurality of targets. Moreover each of the plurality of client computers is preferably operable for querying the database for the location information relating to one or more of the plurality of targets. The computer network server is preferably operable for communicating with the plurality of client computers over an Internet connection. Preferably, the plurality of client computers are each operable for producing a map showing thereon a geographic picture of one or more of the plurality of targets. Moreover, the plurality of client computers are preferably each operable for making a query to the computer network server to provide updated location information for one or more of the plurality of targets. The computer network server is operable for communicating the query through the wireless network system to respective of the plurality of wireless communication units. Each of the plurality of wireless communication units is operable for responding to the query through the wireless network system, the computer network server and to respective of the plurality of client computers for providing the updated location information.

In a preferred embodiment, the computer network server is operable for storing the query in the database for operation using a server program for communicating the query to the wireless network system. The server program is operable for storing the updated location information in the database prior to providing the updated location information to a respective of the plurality of client computers.

It may be that at least a portion of the plurality of targets comprises a plurality of transport vessels. A second wireless network system may be used if necessary for communicating with the plurality of transport vessels. The database is also operable for storing vessel location information.

In one embodiment of the invention, a two-way pager may be used for contacting one or more of the plurality of wireless communication units.

In another embodiment of the invention, the pager/modem may be removed from the monitor unit where it is desired to simply track the target during operation based on some criteria in which case the microcontroller is programmable for storing a plurality of records in the memory relating to the target location information. Preferably, a computer may be provided for receiving the plurality of records and producing a map showing a path of movement of the target with respect to a time period. The computer may preferably be operable for comparing the path of movement of the target with a second path of movement for a second target.

Therefore, it is an object of the present invention to provide an improved monitoring device and system.

Another object of the present invention is to provide a device for monitoring at a substantially reduced cost.

Yet another object of the present invention is to provide a system that is operable at a substantially reduced cost.

Yet another preferred object of the present invention is to provide a system that is accessible by numerous clients located anywhere in the world to operate control units also located anywhere in the world for the asset or target of the client.

A preferred feature of the present invention is a low-cost microcontroller programmed in a low level language related to an architecture of the microcontroller.

Another preferred feature of the invention is a pager-based system with a pager modem interface.

A preferred advantage of the present invention is that each monitor/target interface can be configured differently because all initialization information is stored in a central database.

Another preferred advantage of the present invention is that some components can be removed where different types of monitoring are desired for lowering costs even further.

The above objects, features, and advantages are not to be construed as limiting the invention in any way but are provided merely as an aid in understanding the ramifications of the invention with respect to presently preferred embodiments of the invention. Moreover, these and yet other diverse objects, features, and advantages of the present invention will become apparent from the drawings, the descriptions given herein, and the appended claims.

BRIEF DESCRIPTION OF THE DRAWINGS

FIG. 6 is a pictorial diagram representative of a client computer screen showing a location of the client's target, in this case a vehicle, on a map generated by a computer in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

BRIEF DESCRIPTION OF THE PREFERRED EMBODIMENTS

Figure 1:
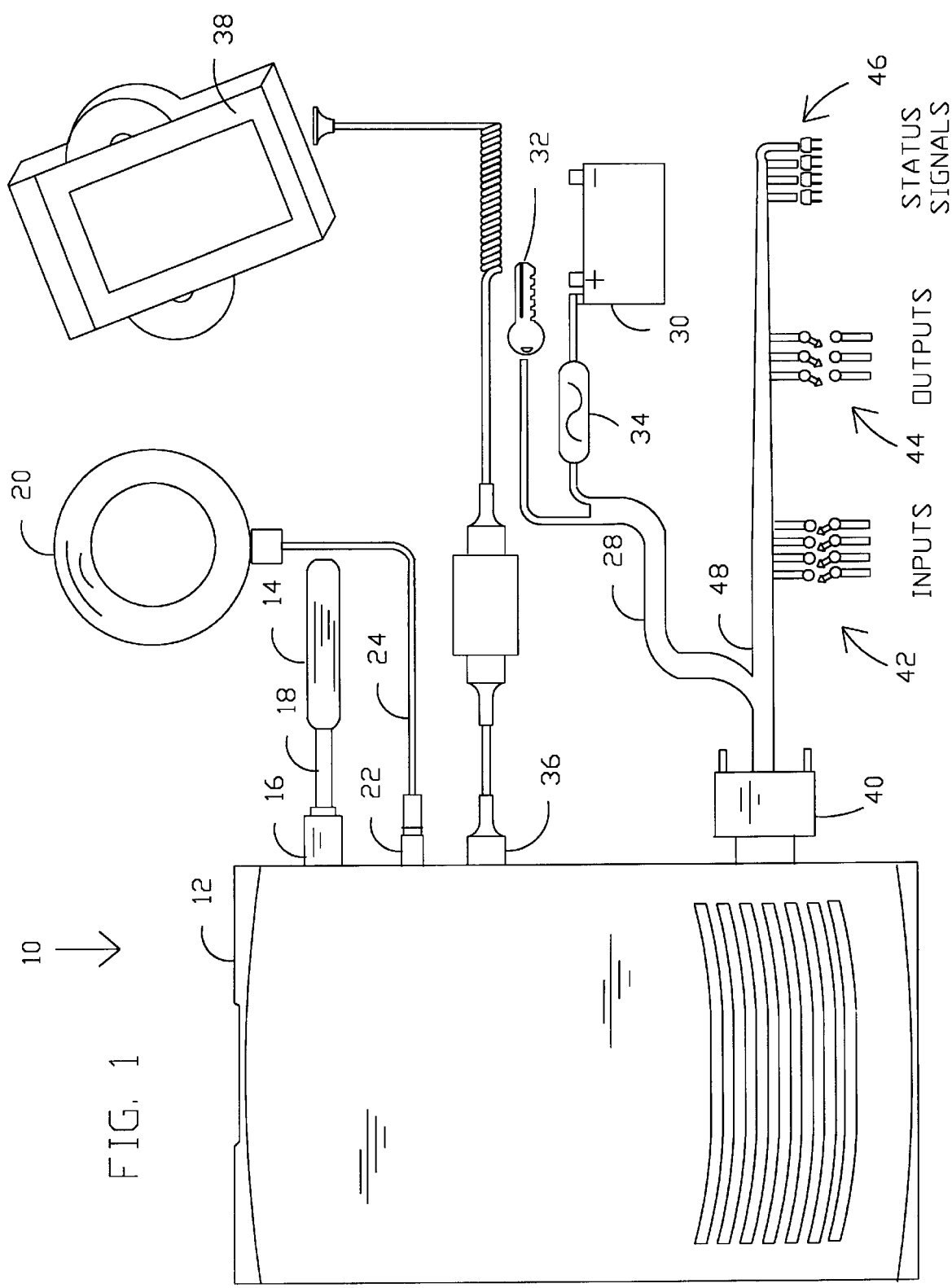
FIG. 1 is a pictorial diagram for a monitoring device in accord with the present invention.

The present invention provides a unique and low-cost system and method for monitoring a wide range of targets as discussed subsequently. U.S. Provisional Application No. 60/119,378, filed Feb. 9, 1999 and U.S. Provisional Application No. 60/125,658, filed Mar. 22, 1999 are hereby incorporated herein by reference. Referring now to the drawings, and more particularly to FIG. 1, there is shown a physical representation of monitoring device 10 in accord with the present invention and various attachments that might be used with various items to be monitored. Such items are referred to herein generally as targets that are assets of some type which are desirably monitored. It will be noted that FIG. 5 discloses a block diagram of the electronics of monitoring device 10 and FIG. 4 discloses a flow diagram for software used in monitoring device 10.

Enclosure 12 is a relatively small housing that may be conveniently mounted for operation. While the attachments to monitoring device 10 are suitable for use with a vehicle, monitoring device 10 may be used with many targets such as assets to be monitored including mobile vehicles such as cars, trucks, ships and/or cargo or assets that may be transported. The monitoring device may also be used with fixed objects such as utility meters, houses, various systems as a remote control unit, and other such functions. There is really no limitation on the types of targets/assets with which monitoring device may be used. For instance, monitoring device 10 might be used for tracking bicycle messengers or even be used for tracking people. The low cost of the service for wireless communication and low cost of the monitoring device 10 allow wide use of the device where cost and size effectively prohibited widespread monitoring usage in the past. The reasons for the low costs will be explained and become apparent as the components of the system are disclosed and discussed hereinafter.

Pager antenna 14 is provided with an appropriate connection 16 and antenna cable 18 of suitable length for the intended application. Global positioning sensor (GPS) antenna 20 is connected at 22 to monitoring device 10 via cable 24. Preferably the antennas 14 and 20 are mounted such that they do not interfere with each other and so the reception is maximized. Various pager and GPS type antennas could be used with monitoring device 10.

Cable 28 is used to connect the unit to power. While the type of connection will depend on the application, it will be noted that where necessary for security purposes, monitoring device 10 can be connected to power in such a way that it will be difficult to operate the vehicle if monitoring device 10 is disconnected or otherwise damaged. Various types of labyrinth wiring possibilities for connecting to the ignition system are well known that make it difficult or impossible for operation of a vehicle without rewiring of the ignition system, typically a time consuming project even for a skilled mechanic. If that type of security is not necessary, then such connections are not required.

Monitoring device 10 may be connected to battery power 30 of a vehicle, or other asset to be monitored, in several different ways. For instance, power to monitoring device 10 may be of two types including battery power 30 and ignition power 32. With this power option, some circuits are unpowered and others that draw little power continue to be powered to maintain the settings. For instance, the global positioning sensor (GPS) may be of the type that permits a low power-on function to prevent the need for initialization of the GPS as may typically be required after all power is turned off to the GPS. The GPS initialization process may otherwise typically take in the range of about 90 seconds to be completed before a position fix may be taken. Another power option is simply to leave all circuits of monitoring device 10 connected to the battery. This option might slowly drain battery 30 but because the monitoring device 10 draws very little power, this will not normally be a problem unless battery 10 is not charged for extended periods. It will also be noted that monitoring device 10 may be programmed to control power itself as discussed subsequently so as to further reduce power usage. Another power option is to connect monitoring device 10 directly to ignition 32 so that power is applied only when the ignition is on. As discussed above, this will typically require an initialization of the GPS and a delay before location fixes can be taken. Other options may also be used. For instance, in some applications it might be desirable to include a battery within monitoring device 10 for various reasons such as to provide emergency power and/or perhaps provide notification of battery power outage, impending battery outage, or other power outage. It will be understood that other types of power such as AC power could possibly be used where desired with suitable converters or that monitoring device 10 may be provided with means for handling AC power. Fuse 34 or other suitable protection means is preferably used for protecting both monitoring device 10 and any circuits to which it is attached.

Computer port 36, which is preferably an RS-232 port, is provided for connecting computer 38 to monitoring device 10. This is an optional connection but will be convenient for use with portable computers. As monitoring device 10 includes a low cost pager modem, there is no need to provide a much more expensive modem with computer 38. Also, because a pager network is used with monitoring device 10, costs for usage are kept much lower as compared with cellular telephone networks. Computer 38 may be also be used in connection with monitoring device 10 for debugging and other functions such as downloading recorded information. Computer 38 may also be used for E-mail, Internet connections, messaging, and other purposes as desired.

Figure 2:
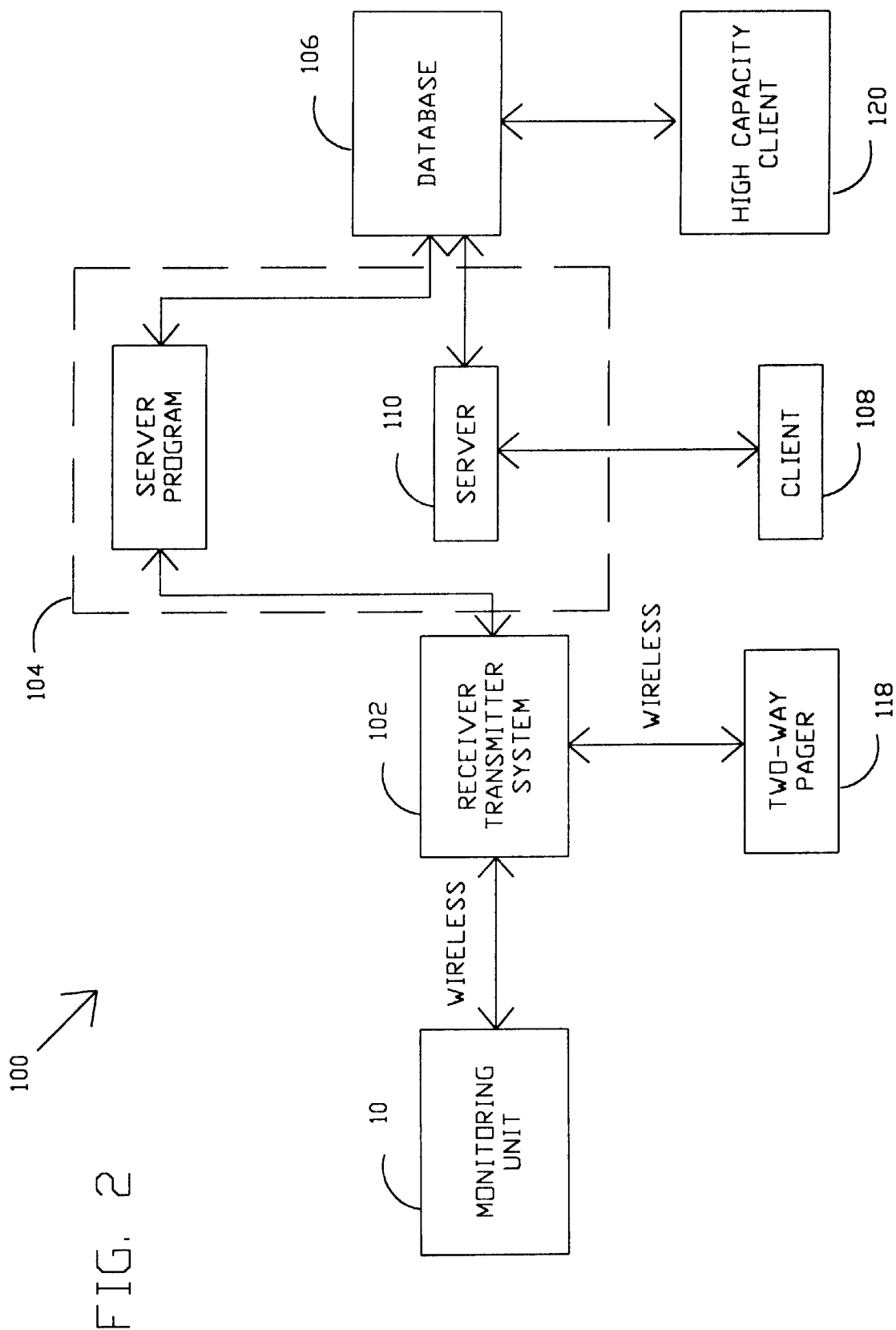
FIG. 2 is a block diagram of a system for monitoring a plurality of targets in accord with the present invention.
Figure 3:
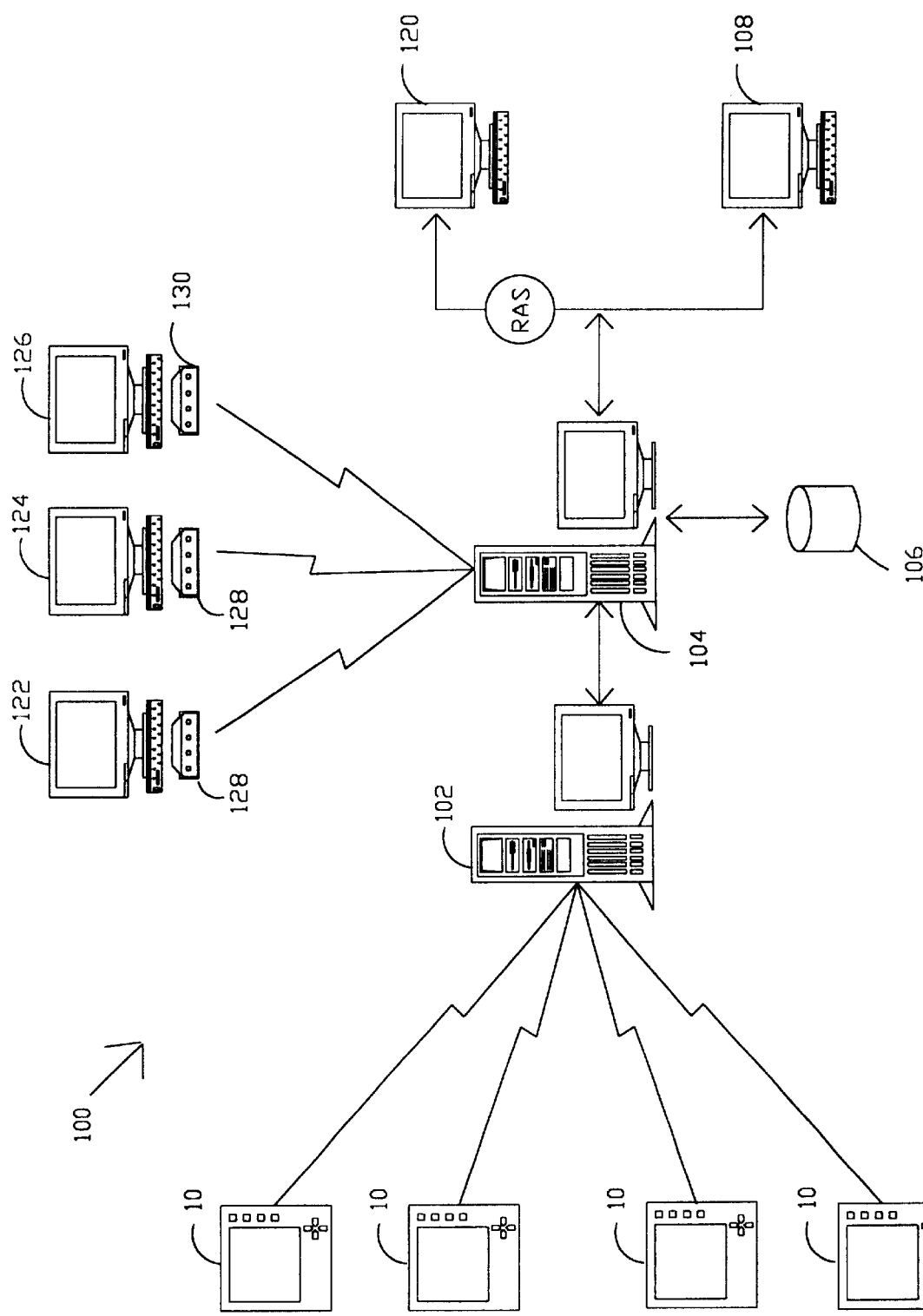
FIG. 3 is a pictorial schematic for a system for monitoring a plurality of targets in accord with the present invention.

Digital I/O or interface 40 connects inputs 42, outputs 44, and status signals 46 to monitoring device 10 preferably via cabling 48. In a presently preferred embodiment, inputs 42 may include up to four switches, buttons, or sensors. In another embodiment, sixteen inputs or variations might be used where each of the four inputs represents a digital number. It will be noted that because monitoring device 10 is preferably used with system 100 as shown in FIG. 2 or FIG. 3, that inputs for any particular monitoring device 10 may be different, e.g., if there are one thousand monitoring devices 10 in operation, each device may be configured differently. The flexibility comes because during initialization of monitoring device 10, the various inputs 42 and outputs 44 are listed and entered into a database of system 100 where they are defined along with any desired response that a client may wish system 100 to make, e.g., e-mail, telephone call, pager alarm, etc. Inputs to monitoring device 10 for use with a vehicle may include, for example only, a panic button, air bag deployment, siren, lights, auxiliary signals, cargo door sensor (open/close), or a threshold indicator such as cargo temperature exceeds a threshold.

If desired, certain events, e.g., a door opening, may trigger a data reporting signal. For instance, the location of a vehicle could be determined and transmitted each time a door opens. In such a case, the door opening would be programmed into system 100 with a request to check and store location information. Then, each time the door opened, monitoring device 10 would transmit this event to system 100. System 100 would request location information from monitoring device 10 and store the information in a database. That information would then be available to the client who would be able to access database information, perhaps with a map as shown in FIG. 6, and as discussed subsequently. As another example, system 100 might be initialized such that an input is designated as an air bag with an emergency response being set up for whenever the air bag deploys. System 100 could be programmed to request location information from monitoring device 10 if the air bag deploys and then automatically request emergency service by providing the location information to police and ambulance services in the area where the air bag deployed.

As an alternative embodiment of the invention, where a large number of units were to be the same, it would be possible to program monitoring device 10 to collect or log information in its own memory. For specific use in data logging, monitoring device 10 would not necessarily even need the pager and pager modem for collecting location information responsive to a trigger signal to reduce the cost of monitoring device 10 even more. Downloading to a computer, such as computer 38 could be accomplished at an appropriate time such as the end of the shift or day, for each vehicle, to determine, for example, routes and for optimization thereof.

Monitoring device 10 may be used to produce outputs such as door locks, ignition kill, to produce an audible alarm for the driver, or to effect any other feature that can be electrically interfaced to monitoring device 10. While FIG. 1 indicates up to three outputs, additional outputs may be obtained by using lines that otherwise provide status signals 46 as outputs. If necessary, a digital circuit could conceivably be used to produce up to 16 different outputs based on using the same four output lines to provide a code. Thus, numerous different outputs may be used. Moreover, system 100 can remotely control the outputs. Thus, a client who logs onto system 100 through the Internet, and who may be in another country, can effect a desired output through monitoring device 10. Status signals 46 may typically include LED indicators to show power on, the battery is ok, communication is in progress, GPS is obtaining a fix, and the like. Other status signals could also be used, if desired.

Some uses of the above components may be illustrative. For instance, finance companies may be more likely to finance auto purchase for individuals with less than perfect credit because with monitoring device 10 installed, they will be able to assure proper asset protection and recovery of the asset with the currently costly locating and repossession processes. As another example, when an automobile reseller places the unit in a car, then on a daily or even hourly basis the reseller can assure the location of all of the vehicles each day. The dealer can also disable, secure, and set alarms on all of their vehicles at the end of each day by a single computer command from their computer. This same process can activate all units with a single command the next morning and inform the dealer of problems with any car, such as low battery. The dealer can assign a range that their cars are not authorized to depart from, say a five-mile radius about the lot, and if any car does leave this limited area, the dealership can be notified by system 100 along with law enforcement officials. The automobile can be tracked and when it is stopped, the automobile can be deactivated and the dealer notified of the location. When sold, the unit costs could be passed by agreement to the purchaser because the purchaser can get a lower finance rate by allowing the finance organization the right to send messages pertaining to payment status and to deactivate the automobile if contract requirements are not being met. The finance company benefits because cost for collection agencies and wrecker services is reduced or eliminated. When the finance company is ready to pick up the deactivated auto, they will know the exact location. They can send someone to pick up the car, have it activated, open the doors, and so forth. If a two-way pager is used, for instance as discussed hereinafter, the person to pick up the car can open the doors by sending a signal with the two-way pager. For the automobile owner, the options are very broad. The location of the vehicle is known, it can be tracked, the alarm can be activated, lights flashed, or when the car is stopped it can be activated and law enforcement can be notified of the location. Turn by turn directions, road side assistance, and the like are available. When traveling across the country, monitoring unit 10 will automatically reacquire when it enters a new service area and system 100 will be notified of the location anywhere in the United States the unit is operated.

While system 100 can easily be programmed during initialization to activate the outputs in a desired manner, monitoring unit 10 may also be programmed for operating desired outputs upon the occurrence of an event if desired as may typically occur when a large number of vehicles or other targets are desired to be wired in a similar way. For instance, it may be desired that upon air bag deployment, monitoring unit 10 automatically sends location information without the need for a request to do so from system 100.

Figure 4:
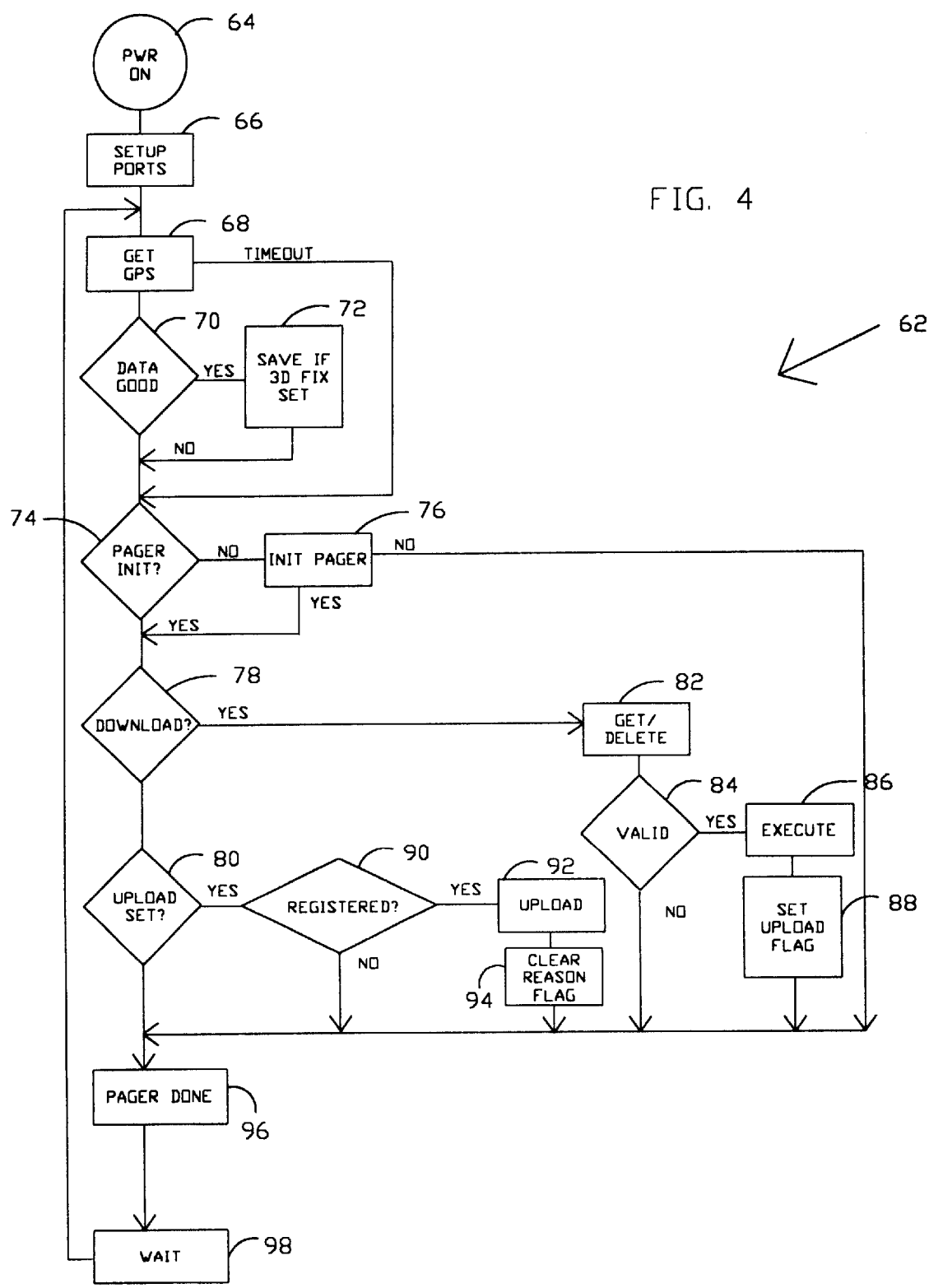
FIG. 4 is a flow diagram of programming control for a microcontroller for use in a monitoring device in accord with the present invention.
Figure 5:
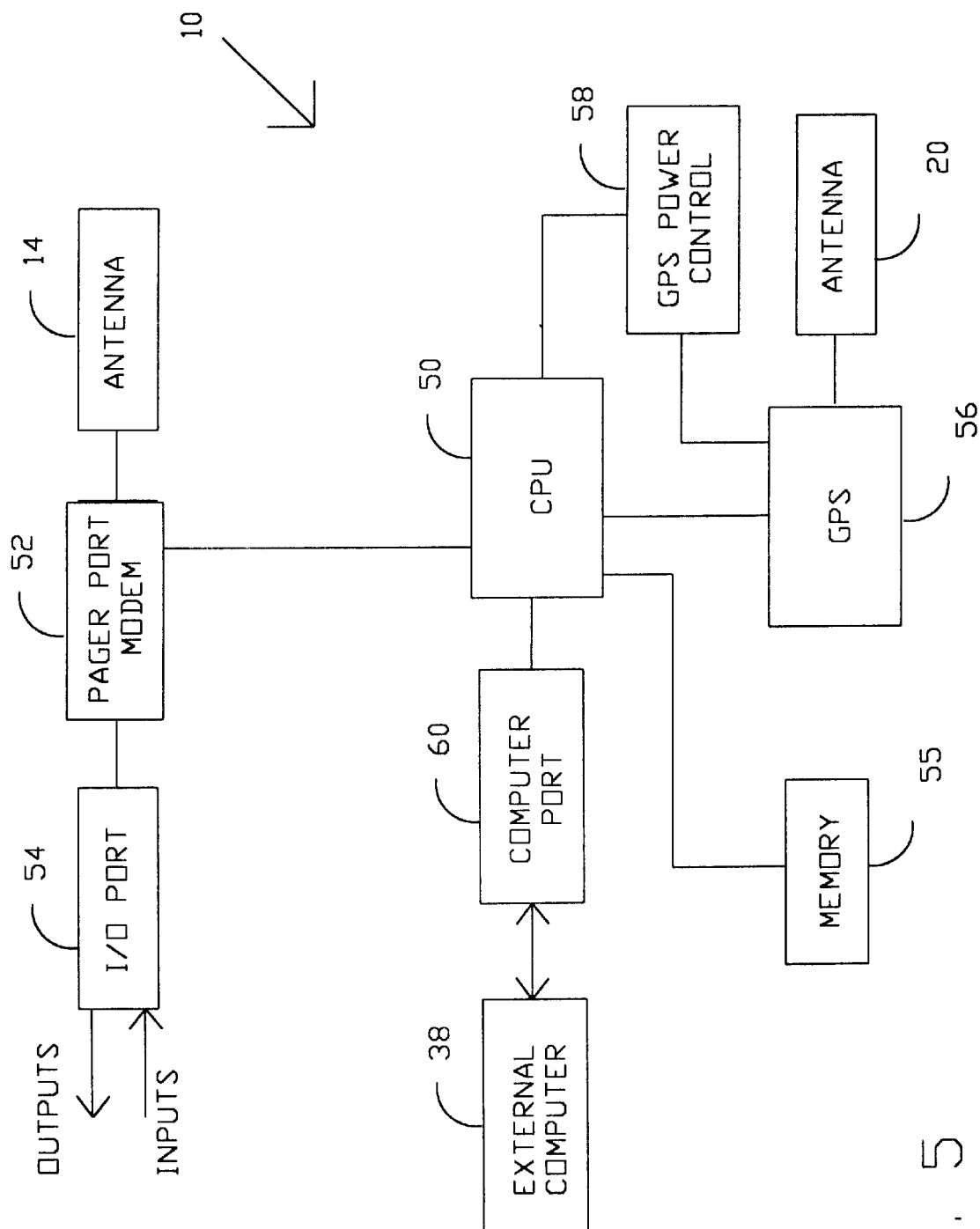
FIG. 5 is a block diagram of a monitoring device in accord with the present invention.

FIG. 5 provides a block diagram of the circuitry of monitoring unit 10 an FIG. 4 provides a flow diagram of software for monitoring unit 10. One reason for the very low cost of monitoring unit 10 is the use of microcontroller 50 as the means for operating monitoring unit 10. While microcontrollers require programming in a low-level language that is closely related to the architecture of the chip, the cost of a microcontroller is much less than an embedded computer system that would allow programming in a high-level language useable with many different computers. Once programmed, the low cost of the microcontroller greatly reduces overall costs of monitoring unit 10 and additional units may simply copy the same program into the microcontroller memory. In larger quantities, a microcontroller as used may cost in the range of $2 each which is many times less expensive than even the lowest cost embedded computer systems. In a presently preferred embodiment, monitoring unit 10 uses a PIC 16 microcontroller chip. The traditional definition of a microcontroller is that of a processing engine with program ROM on the chip. The presently preferred embodiment microcontroller 50 has about 1000 bytes of ROM and also has a small amount of RAM which is less than 100 bytes. In this particular model, the chip does not have a port to read the program out so for security reasons, the program is protected. One of the functions provided by microcontroller 50 is to provide information in the correct format to the pager port modem interface 52. To save costs, this approach is used so there is no need to change the interface hardware/software between the modem and pager but rather microcontroller 50 operates the modem to provide information in a format accepted by the pager and pager/modem interface hardware/software. Thus, this approach provides another significant development cost savings.

The use of a pager with a pager modem is also much less expensive than the use of a cellular telephone with a modem. Therefore, equipment costs are greatly reduced. Furthermore, air time cost is also greatly reduced as pager air time costs much less than cellular telephone air time. Item 52 includes the pager/modem/port connections as well as the interface between the pager and port that is preferably commercially obtained and left unmodified as discussed above so as to remain in compliance with FCC regulations without the need for retesting, modification, and so forth. Using these formats rather than attempting to modify this equipment is considered a significant cost savings of the presently preferred embodiment although these items could be modified, if desired. In a presently preferred embodiment, pager port/modem 52 has inputs and outputs to form I/O port 54 built in, as has only recently become commercially available, thereby saving additional costs of providing the I/O port directly from microcontroller 50 as could also be provided. Moreover, by eliminating input/output circuitry driven directly by microcontroller 50, component costs are reduced further. It is also possible to provide additional memory 55 which is preferably nonvolatile RAM such as an EEPROM to give greater flexibility of operation for monitoring unit 10. Memory 55 may be used to store events, for logging purposes, and generally provides much more flexibility of operation for monitoring unit 10.

As presently preferred, I/O port 54 is operated indirectly by microcontroller 50 through pager port 52 rather than directly. It will be noted as discussed subsequently that events that occur, i.e., signals from the target, are transmitted according to the programming of microcontroller 50. As explained subsequently, this procedure reduces air time costs. Preferably, at least two outputs of I/O port 54 have sufficient current for driving relays so as to control larger current devices. If required, driver circuits could be added as desired to effect more output control circuits. As discussed earlier, digital units with driver circuits could be added to the presently preferred embodiment of monitoring unit 10 to control sixteen outputs and/or receive sixteen inputs. The outputs and inputs are electrical signals that are used with the target and are related to the type of target and may include a wide range of signals. Microcontroller 50 presently handles on/off types of signals rather than analog signals so as to keep costs low, digitized analog signals could conceivably be used through computer port 60.

Pager antenna 14 and GPS antenna 20 are connected to pager/modem 52 and GPS 56 as indicated. Global position sensor or GPS 56 preferably supports both standard and differential position information. GPS 56 communicates with microcontroller/CPU 50 and provides location information whenever requested. To save power, microcontroller 50 can place GPS 56 in an idle position by means of GPS power control 58 until a GPS signal is requested by microcontroller 50, which in turn may have been requested from system 100 through pager/modem/pager port 52. Power control may be effected by a mosfet or other switching device as desired for low cost and reliable operation.

Computer port 60 is preferably an RS-232 port that provides the correct voltage levels, connectors, and so forth for compatibility with an external computer, such as external computer 38, discussed hereinbefore.

Typical operation of monitoring unit 10 may be described in terms of microcontroller 50 programming as per flow diagram 62. At the time monitoring unit 10 is powered on as indicated at 64, the unit begins to operate as per the flow diagram. Since the program information is stored in ROM in microcontroller 50 and any information saved in nonvolatile RAM memory 55, all memory information is readily available when power is turned on and is not lost with loss of power. Therefore, disconnection of the car battery for replacement or other reasons for loss of power does not alter operation of monitoring unit 10 once power is restored.

If monitoring unit 10 has just been installed, then it is necessary to initialize the ports as indicated at 66. Initialization essentially requires notifying system 100 what each port is connected to, what the desired response is for any signal from the ports, and whatever requirements the client may have which information is typically stored in the database of system 100 as discussed subsequently. This may be accomplished with a form that is filled out and provided to system 100. For instance, the form may ask what each input line is connected to, e.g., line one to an air bag sensor, line two to a battery indicator, etc. Then a response for system 100 may be provided for each such event. Likewise the outputs are listed, e.g., output line one to alarm, output line two to door locks, output line three to an engine kill, etc. In this way, system 100 and/or the client can operate each of these items remotely. The client has the option to change or modify responses to signals as desired.

At item 68 in the flow diagram of FIG. 4, microcontroller 50 sends a command to GPS 56 to provide GPS location data that is indicative of the position at which monitoring unit 10 is located. Depending on the particular mode of operation and programming, this may also require turning GPS power on as indicated at 58 so that GPS 56 is no longer in an idle mode. Upon power up to monitoring unit 10 where power has been completely removed, it may take from one to several minutes to obtain a reading from GPS 56. If a GPS signal is not obtained within a certain time period, or if the GPS is removed (see discussion above on operating monitoring unit 10 without the GPS for stationary objects), then a timeout condition occurs and operation continues as indicated by flow diagram 62. A typical time period might be about three seconds but could vary depending on the type of GPS or as desired.

Assuming GPS 56 provides location data to microcontroller 50, then the location data is checked using a checksum method or other data checking means as indicated at 70. If the location data is determined to be valid, then the location data information is saved at 72 assuming it is desired to save the location data. Thus, a flag may be set that determines whether or not to save the location data and may typically be set in response to a signal from system 100. The location data may be logged if desired into memory such as memory 55 if it is desired to save a series of location data. While system 100 can effect logging on any time schedule or in response to events that may occur with respect to inputs, monitoring unit 10 may also be programmed to log data into memory 55 such as events, location data, output signals, and the like.

Upon completion of the above described data collection sequence, the GPS portion of the signal is completed until the next cycle of the program. At this time, microcontroller 50 checks as indicated at 74 to see if the pager (which is considered part of pager port/modem indicated at 52) has been initialized. It is necessary to initialize the pager upon the first program cycle after installation of the unit. After the first program cycle, the necessary initialization information is stored in nonvolatile memory and a flag is set so that the program would skip this and go to the next step. Initialization occurs at step 76 and may include, for instance, determining that pin numbers for the pager in port/pager/modem 52 and for monitoring unit 10 are established for setting up the pager network and setting forth where messages from each monitoring unit 10 or group of monitoring units 10 are stored. Thus, this step includes the steps that are typically required for the preferred two-way pager operation. As well, the inputs and outputs may be checked to insure they are operational. External computer 38 may be used via computer port 60 to aid in set up or to change programming if desired. Once initialization is successfully accomplished, a flag is set to the effect the pager has been initialized and this process need not be repeated. If initialization fails for some reason, or is incomplete, then the program proceeds to the end and loops back to start again.

Assuming the initialization flag is set, then microcontroller 50 checks to see if flags are set for new messages from system 100, and if so, then the messages are downloaded as indicated at 78. To save costs on air time, all the messages are preferably executed prior to uploading or transmitting at 80 so that all upload messages can be sent at the same time. If there is a message from system 100, then it is downloaded and the message is deleted from the list or queue of messages if there is more than one message waiting. Assuming the message makes a valid request or one that is in line with initialization criteria as indicated 84, then the message is executed at 86. An example might be a message from system 100 to send location data. In that case, at this time microcontroller would proceed according to programming to poll GPS 56 to obtain an update of the location. As another example, system 100 might send a message that has the effect of unlocking the doors of a vehicle. In this case, microcontroller 50 would contact pager port 52 and activate the appropriate output. System 100 would have the information as to which output to activate and the message would specify that output. If the message requires an upload, then the upload flag is set as indicated at 88.

Assuming all downloads are complete, then as indicated at 80 a check is made as to whether the upload flag is set. The flag can be set in several ways. The upload flag may be set if any of the inputs have been activated. Programming could also provide for setting the flag at a time interval. If one or more inputs such as an air bag deployment, alarm, high temperature, or other input occur, then the flag may be set. As well, an upload flag may have been set as discussed at 88. A check is made that the unit initialization is registered at 90 and then an upload or transmission as indicated at 92 is made. Thus, for an upload, microcontroller 50 would encode the upload message into a format that is acceptable by the modem/pager interface through a connection in the pager port 52. The pager of port 52 transmits the message according to pager network protocol with any standard checks to ensure accurate transmission. After transmission, the reason flag for that particular upload is then reset after transmission as indicated at 86. At this point in the program, the pager section of the program is complete as indicated at 96. A delay or wait state is implemented at 98 which is typically only a short duration.

As discussed above, microcontroller 50 uses a low level language for implementation and does not have sufficient memory or a compiler to allow it use of a high level language. By high level is meant a language that is transferrable between different types of computers such as FORTRAN, C, or the like. Low level languages, which may include machine language, are dependent upon the particular architecture of a particular processing system and so are not typically transferrable from one machine to another unless the machines are intentionally made to be compatible. Use of low level language is more time consuming for the initial programming, but because the same program can be used in many monitoring units 10, the hardware to process a low level language is less expensive, and the overall result is a very low per unit cost when sold in volume. Moreover, low level language often executes more quickly than higher level languages and memory is used much more efficiently.

Referring now to FIG. 2 and FIG. 3, system 100 is presented in two different ways so as to provide a more complete description thereof and to show more fully the various possible interconnections. In FIG. 2, a basic block diagram of components is disclosed.

Monitoring unit 10 has been described hereinbefore in some detail and it will be understood that system 100 may work with large numbers of such units that may be operating throughout the United States and, in fact, may be located anywhere worldwide. Each monitoring unit 10 communicates with one or more pager networks 102 by wireless transmission means. In the U.S., the F.C.C. assigns a frequency band for this type of communication and pager network 102 acts to transmit and receive messages. Pin numbers are used to verify authorization, to determine with which unit 10 communication takes place, and where to store messages. It will be understood.that a pager network will have an infrastructure that includes numerous different antennas in order to cover a wide area and may typically include most, if not all, of the area of interest such as the U.S. or another country. Anywhere in the world a pager would work, then monitoring unit 10 can also communicate. System 100 may include more than one pager network and retains the necessary information to communicate with monitoring unit 10 through different regions and within different pager network systems.

A connection is provided between pager network 102 and server 104 that may include a direct connection or a connection over a network such as an Internet connection. It will be understood that one or more servers may be used for operation of system 100. Server 104 operates with database 106 which, in a presently preferred embodiment, is an Oracle™ database. In the database, the information for operation of system 100 with each monitoring unit 10 is stored. For instance, for each particular monitoring unit 10, database 106 stores the relevant inputs and outputs, client specifications regarding inputs and outputs, client messages and types of messages in response to signals, and so forth. For instance, data in database 106 may be included to monitor location at a particular time interval, monitor whether the location goes outside of a defined area such as a car leaving an area of town, send a notification to the appropriate client by the client's desired communication means, and so forth. Database 106 may include a wide variety of information such as contact numbers, emergency numbers for different regions, and the like so as to be able to offer a wide array of possible types of communication including even partially non-automated communications such as notification to an operator to contact a client by telephone, radio, or the like. Automatic communications may include e-mail messages, pager messages, telephone messages, fax messages, and others including any automated means of communication.

In a preferred embodiment, database 106 also includes a table or list of messages to be sent and a table of incoming messages which are operated on. Once operated on, the messages may be saved for as long as the client desires to keep track of communications that have occurred. A client may send one command that affects all his targets. For instance, a car sales outlet might send a single message to all vehicles to lock the doors and turn on the burglar alarm.

To illustrate a typical operation, numerous different clients such as client 108 may log onto system 100 over the Internet, through a modem connection, or other connection. Client 108 does not need to have a computer and may simply call an operator by telephone, radio, two-way pager or other communication means. At any rate, client 108 contacts system 106 to request information, in response to a message from system 100, to send a command to one or more monitoring units 10, or for other such reasons. For instance, assume client 106 has four vehicles that are being monitored and supplies the appropriate identification number. He may then wish to know the whereabouts of each vehicle. This request may be received by network or Internet connection 110 of server 104. Server 104 contacts database 106, perhaps using an Internet connection or other connection, and database 106 places the message on a table of outgoing messages. In a presently preferred embodiment, a dedicated server program such as server program 112 controls all messaging between transmitter/receiver network 102 and database 106. Therefore, server program 112 takes the message from the table of outgoing messages in database 106, and sends the message to transmitter 106 with the correct pin numbers for identification of the particular four monitoring units to be contacted. The message is then sent out and, due to the identification numbers, the appropriate four monitoring units 10 respond to the request, as discussed above. Thus, the monitoring units 10 provide updated location information that is received by receiver/transmitter system 102. Server program 112 takes these messages from the pin data storage location and sends them to database 106 where they are placed in the table of incoming messages. The client has requested the results sent to him, so the information goes to server 110 and then to client 108. Client 108 may view the information in different ways. For instance, in accord with the present invention, Client 108 may preferably use a program having a screen with a map such as shown in FIG. 6 whereupon one or more vehicles 114 may be shown on the particular street 116 within the map section 109 that is selected for viewing. The client may track the path of vehicles using different symbols and the like as desired. The present invention provides a mapping system and program for tracking, labeling, and monitoring so that assets being sent by different types of transport vehicles such as ships, trains, trucks, and the like can be tracked and reference is made to U.S. Provisional Application No. 60/119,378 filed Feb. 9, 1999 and U.S. Provisional Application No. 60/125,658 filed Mar. 22, 1999 wherein such programming is described in detail and was previously incorporated herein by reference.

System 100 may also be used for monitoring fixed assets such as for utility meter readings, home monitoring, and the like both in an active and passive role. In fact, it may be more desirable to monitor a home by a radio link rather than by a telephone connection as the telephone connection is readily cut or otherwise disabled whereas a radio link is typically be more difficult to detect and disable especially if the antenna is hidden. System 100 also contemplates communication using, for instance, a two-way pager such as two-way pager 118. The pager communicates with server 104 through pager network 102 to thereby send a message to monitoring unit 10. As well, database 106 may be programmed notify two-way pager 102 in response to a message from monitoring unit 10. Thus, using a two-way pager it is possible to stand next to a vehicle and if monitoring unit 10 is appropriately wired, then opening the doors, starting the engine, etc., using a two-way pager.

High capacity clients as indicated at 120 may preferably have a direct connection to database 106. This would allow large clients to monitor, track, and so forth a large number of assets at high speeds. For instance, a utility company checking meters may need to check a large number of meters each day and would preferably have a high speed connection. The connection may be of different types including local area networks, remote via modem connections, and so forth.

System 100 is also operable for communication with other types of transmission as may occur from cargo carriers of all types such as vessels or destinations with respective communication means 122, 124, and 126. Typical examples might include offshore oil platforms that receive cargo, ships carrying cargo, supply ports and so forth. Communication may be derived with different systems such as through packet radio modems 128 or satellite communication transceiver 130. The system of the present invention can track cargo, print manifests, be used for ordering products, list suppliers, and display cargo location on a desired map. Thus, the present system, apparatus, and methods may be used for a wide variety of tracking, monitoring, and logistics purposes.

The foregoing disclosure and description of the invention are illustrative and explanatory thereof, and it will be appreciated by those skilled in the art, that various changes may be made in the system integration and components as well as in the details of the illustrated arrangements or combinations of features without departing from the spirit of the invention.

What is claimed is:

1. A monitoring device for monitoring a target, comprising:

a microcontroller programmed for operating said monitoring device, said microcontroller having no port that allows access for reading programing of said microcontroller;

a wireless transceiver operable for communicating with a wireless network;

a modem for interfacing with said wireless transceiver for communicating over said wireless network;

a global positioning sensor;

an interface between said monitoring device and said target for communicating signals relating to said target;

one or more inputs to said monitoring device from said target; and one or more outputs from said monitoring device to said target, said one or more inputs and said one or more outputs being individually selectable from a plurality of inputs to said target and a plurality of outputs from said monitoring device during installation of said monitoring device to said target such that each of said one or more inputs and each of said one or more outputs are identified as to their nature and stored in a database for each of a plurality of monitoring devices.

2. The monitoring device of claim 1, wherein said target is a vehicle and said interface communicates electrical signals relating to one or more elements of said vehicle.

3. A method for monitoring a plurality of targets, said plurality of targets having at least first and second variables to be monitored and having at least first and second items to be controlled, said first and second variables being selectively different for different of said plurality of targets, said first and second items to be controlled being selectively different for different of said plurality of targets, said method comprising:

attaching a transceiver with an antenna to each of said plurality of targets;

providing a configurable electrical interface with a plurality of ports for each of said plurality of targets for interfacing between said transceiver and said first and second variables to be monitored and said first and second items to be controlled;

entering definition data into a database to define said first and second variables whereby said definition data selectively varies between said plurality of targets, said definition data comprises a configuration of said plurality of ports which are selectively electrically connected with respect to said first and second variables to be monitored and said first and second items to be controlled, said definition for said configuration of said plurality of ports being selectively variable between said plurality of targets;

receiving data through a wireless network from said transceiver, interpreting said received data based on said definition data in said database;

connecting to said database through an Internet connection with a personal computer to receive said interpreted data; and sending control information from said personal computer through said Internet connection for transmission through said wireless network for selectively operating said first and second items to be controlled.

4. The method of claim 3, further comprising:

entering definition data into a database to define said first and second items to be controlled whereby said definition data varies between said plurality of targets.

5. The method of claim 4, further comprising:

transmitting a message from a pager network to said transceiver, receiving said message through said modem, and executing a command responsive to said message wherein:

said control information is interpreted by said definition data in said database prior to wireless transmission.

6. The method of claim 4, wherein:

said definition data includes the meaning of said first and second items to be controlled, which meaning selectively varies between said plurality of targets.

7. The method of claim 4 wherein:

said plurality of targets comprise a plurality of vehicles and said first and second variables comprise variables related to vehicles which are selectively different for said plurality of vehicles.

8. The method of claim 7, further comprising:

remotely operating said module for enforcing a loan related to said vehicle.

9. The method of claim 7, further comprising:

remotely operating said module for determining that said vehicle stays within a selectable region.

10. The method of claim 3, further comprising:

determining a global position, encoding a message to a modem to form a global position message based on said global position, and transmitting said global position message through said transceiver using said antenna.

11. The method of claim 10, further comprising:

receiving said global position message through a wireless network, and saving said global position message in said database.

12. The method of claim 3, further comprising:

providing for remote access to said database through said Internet connection by each of a plurality of different subscribers, each said subscriber being able to communicate only with targets for which each respective subscriber is authorized but not for other of said plurality of targets.

13. The method of claim 12, wherein:

said definition data includes the meaning of said first and second variables, which meaning selectively varies between said plurality of targets.

14. The method of claim 3, wherein:

said target is a structure affixed to the Earth so as to be non-movable.

15. A monitoring system for monitoring a plurality of targets on behalf of a plurality of clients, each of said clients being associated with one or more of said plurality of targets, comprising:

a computer network server operable for communicating with a plurality of client computers through an Internet connection;

a database operable for storing information relating to each of said plurality of targets;

a wireless network system, said computer network server being in communication with said wireless network system; and a plurality of wireless communication units for said plurality of targets, each of said plurality of wireless communication units being operable for communication with said wireless network, each of said plurality of wireless communication units including a global position sensor to provide location information for each of said plurality of targets, said computer network server permitting each of said plurality of client computers to selectively communicate only with said one or more of said plurality of targets with which said client is associated such that each of said plurality of client computers is operable for sending a message to request said location information relating to said one or more of said plurality of targets with which said client is associated.

16. The monitoring system of claim 15, wherein:

each of said targets has one or more electrically controllable elements controllable by said respective client computers through said computer network server and said wireless network.

17. The monitoring system of claim 16, further comprising:

said plurality of client computers being operable for producing a map showing thereon a geographic picture of one or more of said plurality of targets.

18. The monitoring system of claim 16, wherein:
said plurality of said targets comprise a plurality of automobiles wherein each automobile has one or more variables for monitoring by a respective of said client computers and one or more electrically controllable elements to be controlled by said respective of said client computers.

19. The monitoring system of claim 18, further comprising:
said database being operable for storing information for each of said plurality of targets that includes definitions of inputs and outputs related to said one or more variables and said one or more electrically controllable elements for a respective interface between each of said plurality of vehicles for each corresponding wireless communication unit, said definitions of said inputs and outputs being selectively variable from vehicle to vehicle.

20. The monitoring system of claim 15, wherein:
said database comprising a list of ingoing and outgoing messages.

21. The monitoring system of claim 15, further comprising:
said plurality of wireless communication units including a modem for encoding said location information.

22. The monitoring system of claim 15, further comprising:
at least a portion of said plurality of targets being a plurality of transport vessels,
a wireless network system for communicating with said plurality of transport vessels, and
said database being operable for storing vessel location information.

23. The monitoring system of claim 15, further comprising:
a two-way pager operable for contacting one or more of said plurality of wireless communication units through said wireless network.

24. The monitoring system of claim 15, further comprising:
a microcontroller for operating said wireless communication unit, said microcontroller having a memory for programming said microcontroller for operating said wireless unit, said microcontroller comprising a computer and said memory within a single integrated circuit.

25. The monitoring system of claim 24, wherein said microcontroller has no port that allows access for reading programming of said memory.

26. The monitoring system of claim 24, further comprising:
said plurality of client computers are each operable for communicating with said computer network server relating to said electrical signals for said one or more of said plurality of targets with which said client is associated.

27. The monitoring system of claim 26, further comprising:
at least a portion of said plurality of targets are vehicles,
each vehicle having an electrical system connected to said target interface,
said plurality of client computers being operable for sending an electrical signal to said electrical system of said vehicle through said target interface for said one or more of said plurality of targets with which said client is associated.

28. The monitoring system of claim 26, further comprising:
at least a portion of said plurality of targets are vehicles,
each vehicle having an electrical system connected to said target interface,
said plurality of client computers being operable for detecting an electrical signal from said vehicle through said target interface, said wireless network system, and said computer network server in accordance with a description for each said target interface stored within said database.

29. A monitoring system operable for monitoring a plurality of targets on behalf of a plurality of users, each of said users being associated with one or more of said plurality of targets, comprising:
a computer network server operable for communicating with a plurality of client computers;
a database operable for storing information relating to each of said plurality of targets;
a plurality of wireless communication units, a respective of said plurality of wireless communication units associated with said plurality of targets, each of said plurality of wireless communication units including a position sensor to provide location information for each of said plurality of targets;
a wireless network system operable for communicating wirelessly with a plurality of wireless communication units, said computer network server being in communication with said wireless network system, each of said plurality of wireless communication units being operable for communication with said wireless network, each wireless communication unit comprising a transceiver for two-way communication with said wireless network system related to a plurality of control inputs and said plurality of status outputs of said target, each of said plurality of client computers being operable for requesting said computer network server to provide location information relating to said one or more of said plurality of targets with which said client is associated, said computer network server preventing communication with said plurality of targets with which said client is not associated.

30. The monitoring system of claim 29, wherein:
said computer network server is operable for communicating with said plurality of client computers through an Internet connection.

31. The monitoring system of claim 29, further comprising:
said plurality of client computers being operable for producing a map showing thereon a geographic picture of one or more of said plurality of targets.

32. The monitoring system of claim 29, wherein said plurality of targets comprise a plurality of vehicles and said plurality of status outputs relate to a status for each vehicle, said status outputs being selectively different for each vehicle.

33. The monitoring system of claim 32, wherein said plurality of targets comprise a plurality of vehicles and said plurality of control inputs relate to electrically controllable features for each vehicle, said control inputs being selectively different for each vehicle.

34. The monitoring system of claim 33, wherein said plurality of wireless communication units further comprise:
   transmitter and receiver electronics for two-way communication with said wireless network system related to said plurality of inputs and said plurality of outputs and said location information.

35. The monitoring system of claim 34, wherein said plurality of wireless communication units further comprise:
   programmable electronics related to said plurality of said control inputs and said plurality of status outputs such that each wireless communication unit is operable for adaptation to selection for each vehicle of said plurality of control inputs and said plurality of status outputs.

36. The monitoring system of claim 35, wherein:
   a plurality of said vehicles comprises a door lock as a control input such that each of said plurality of client computers is operable for selectively controlling said door lock of said plurality of vehicles with which said client is associated.

37. The monitoring system of claim 34, further comprising:
   said database being operable for storing information for each of said plurality of targets that includes definitions of control inputs and status outputs for a respective interface between each of said plurality of targets and each corresponding wireless communication unit.

38. The monitoring system of claim 34, further comprising:
   said database being operable for containing a list of ingoing and outgoing messages.

39. The monitoring system of claim 29, further comprising:
   said plurality of wireless communication units including a modem for encoding said location information.

40. The monitoring system of claim 29, further comprising:
   at least a portion of said plurality of targets being a plurality of transport vessels, said database being operable for storing vessel location information.

41. The monitoring system of claim 40, further comprising:
   a target interface for each of said plurality of wireless communication units for communicating electrical signals to said wireless communication unit related to said plurality of transport vehicles.

42. The monitoring system of claim 29, further comprising:
   said plurality of client computers are each operable for communicating with said computer network server relating to said electrical signals for said one or more of said plurality of transport vehicles with which said client is associated.

43. The monitoring system of claim 29, further comprising:
   a microcontroller for operating said wireless communication unit.

44. The monitoring system of claim 29, further comprising:
   at least a portion of said plurality of targets are vehicles,
   each vehicle having an electrical system connected to said target interface,
   said plurality of client computers being operable for sending an electrical signal to said electrical system of said vehicle through said target interface for said one or more of said plurality of targets with which said client is associated.

45. The monitoring system of claim 29, further comprising:
   at least a portion of said plurality of targets are vehicles,
   each vehicle having an electrical system connected to said target interface,
   said plurality of client computers being operable for detecting an electrical signal from said vehicle through said target interface, said wireless network system, and said computer network server in accordance with a description for each said target interface stored within said database.

* * * * *

UNITED STATES PATENT AND TRADEMARK OFFICE
CERTIFICATE OF CORRECTION

| | | |
|---|---|---|
| PATENT NO. | : 6,611,686 C1 | Page 1 of 1 |
| APPLICATION NO. | : 90/009121 | |
| DATED | : March 15, 2011 | |
| INVENTOR(S) | : Smith et al. | |

It is certified that error appears in the above-identified patent and that said Letters Patent is hereby corrected as shown below:

Col. 3, Line 41, "controlled" should read --monitored--.

Col. 6, Line 57, "controlled" should read --monitored--.

Signed and Sealed this
Twelfth Day of January, 2016

Michelle K. Lee
*Director of the United States Patent and Trademark Office*

US006611686C1

(12) EX PARTE REEXAMINATION CERTIFICATE (8091st)

United States Patent
Smith et al.

(10) Number: US 6,611,686 C1
(45) Certificate Issued: Mar. 15, 2011

(54) TRACKING CONTROL AND LOGISTICS SYSTEM AND METHOD

(75) Inventors: Joseph D. Smith, Freeport, TX (US); Austin L. Higgs, Lake Jackson, TX (US); Thien K. Nguyen, Freeport, TX (US)

(73) Assignee: Thinair Wireless Corporation, Houston, TX (US)

Reexamination Request:
No. 90/009,121, May 27, 2008
No. 90/010,601, Sep. 3, 2009

Reexamination Certificate for:
Patent No.: 6,611,686
Issued: Aug. 26, 2003
Appl. No.: 09/317,388
Filed: May 24, 1999

Related U.S. Application Data

(60) Provisional application No. 60/119,378, filed on Feb. 9, 1999, and provisional application No. 60/125,658, filed on Mar. 22, 1999.

(51) Int. Cl.
*G08G 1/23* (2006.01)
*G08B 23/00* (2006.01)

(52) U.S. Cl. .................................. 340/990; 340/426.19
(58) Field of Classification Search .................. 370/352, 370/401; 710/8
See application file for complete search history.

(56) References Cited

U.S. PATENT DOCUMENTS

| 4,920,488 | A |   | 4/1990 | Filley ........................ 364/403 |
|---|---|---|---|---|
| 5,469,557 | A |   | 11/1995 | Salt ........................... 395/425 |
| 5,513,244 | A |   | 4/1996 | Joao ........................... 379/58 |
| 5,594,425 | A |   | 1/1997 | Ladner .................. 340/825.06 |
| 5,717,950 | A | * | 2/1998 | Yamaguchi et al. ............ 710/8 |
| 5,835,377 | A |   | 11/1998 | Bush ..................... 364/468.05 |
| 5,917,405 | A |   | 6/1999 | Joao ........................... 340/426 |
| 6,014,628 | A |   | 1/2000 | Kovarik ....................... 705/1 |
| 6,028,537 | A |   | 2/2000 | Suman ....................... 340/988 |
| 6,072,396 | A |   | 6/2000 | Gaukel .................... 340/573.4 |
| 6,220,509 | B1 |   | 4/2001 | Byford ..................... 235/375 |
| 6,331,825 | B1 |   | 12/2001 | Ladner ..................... 340/988 |
| 6,515,996 | B1 | * | 2/2003 | Tonnby et al. ............. 370/401 |
| 6,643,283 | B2 | * | 11/2003 | Derks ....................... 370/352 |

FOREIGN PATENT DOCUMENTS

| WO | WO 97/14054 | 4/1997 |
|---|---|---|
| WO | WO 97/18521 | 5/1997 |
| WO | WO 98/03952 | 1/1998 |

* cited by examiner

*Primary Examiner*—M. Steelman

(57) ABSTRACT

A system, apparatus, and method are disclosed for monitoring, tracking, and logistics purposes that preferably includes a monitoring unit wherein data is processed using a microcontroller. The monitoring unit includes an interface with the target or asset to be tracked such that electrical signals may be sent between the target and monitoring unit to denote events from the target, e.g., air bag deployment and for activating features of the target, e.g., an alarm. The interface may be unique for each monitoring unit because unique information relating to each interface is stored in the system database, e.g., data may be related to a temperature in one unit and to a movement sensor indication in another. Therefore, the system may respond appropriately to signals having unique meanings from each different monitoring unit. A pager unit with a pager modem is controller by the microcontroller to thereby encode the signals for transmission. A pager transmitter/receiver network is used for sending and receiving messages from the monitoring unit. The pager transmitter/receiver network is in communication with a server and the database. The server may be accessed by multiple clients over the Internet or other lines of communication so that the clients at numerous different remote locations may activate controls on their respective one or more remote targets/assets, find the locations thereof, and receive cumulative status reports.

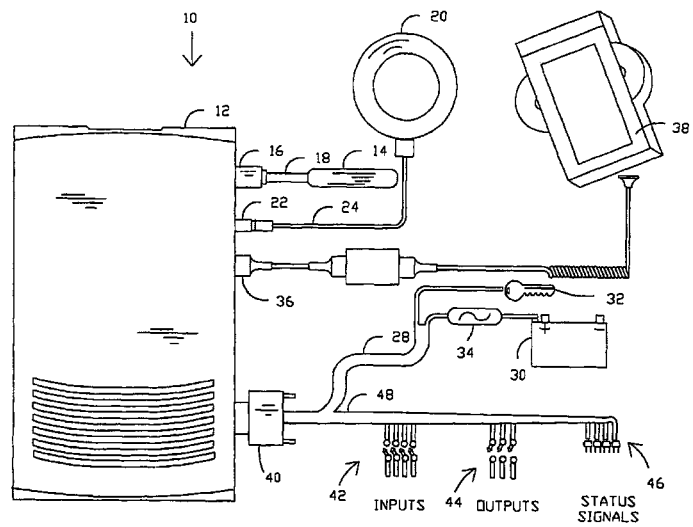

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 18, 19, 21, 33, 34, 35, 37, 38, 39 and 42 are cancelled.

Claims 1, 3, 5, 6, 7, 11, 12, 15, 16, 20, 22, 23, 24, 26, 27, 28, 29, 36, 40, 44 and 45 are determined to be patentable as amended.

Claims 2, 8-10, 13, 14, 17, 25, 30-32, 41 and 43, dependent on an amended claim, are determined to be patentable.

New claims 46-51 are added and determined to be patentable.

1. A monitoring device for monitoring a target, comprising:
a microcontroller programmed for operating said monitoring device, said microcontroller having no port that allows access for reading programming of said microcontroller;
a wireless transceiver operable for communicating with a wireless network;
a modem for interfacing with said wireless transceiver for communicating over said wireless network;
a global positioning sensor;
[an] *a configurable* interface between said monitoring device and said target for communicating signals relating to said target *comprising a plurality of ports*;
one or more inputs to said monitoring device from said target *to be monitored*; and
one or more outputs from said monitoring device to said target *to be controlled wherein said plurality of ports are selectable for connection of said one or more inputs and one or more outputs,* said one or more inputs and said one or more outputs being individually selectable from a plurality of inputs to said target and a plurality of outputs from said monitoring device *to provide a selective wiring to said monitoring device* during installation of said monitoring device to said target, *a network server operable for communicating with a plurality of client computers through an Internet connection, a common database of said network server configured for storing said selective wiring from a plurality of monitoring devices* such that each of said one or more inputs and each of said one or more outputs are identified as to their nature and stored in [a] *said common* database for each of [a] *said* plurality of monitoring devices.

3. A method for monitoring a plurality of targets, said plurality of targets having at least first and second variables to be monitored and having at least first and second items to be controlled, said first and second variables being selectively different for different of said plurality of targets, said first and second items to be controlled being selectively different for different of said plurality of targets, said method comprising:
attaching a transceiver with an antenna to each of said plurality of targets;
providing a configurable electrical interface with a plurality of ports of each of said plurality of targets for interfacing between said transceiver and said first and second variables to be monitored and said first and second items to be controlled;
entering definition data into a *common* database *of a network server* to define said first and second variables *to be monitored and said first and second items to be controlled* whereby said definition data selectively varies between said plurality of targets, said definition data *stored in said common database further* comprises a configuration of said plurality of ports which are selectively electrically connected with respect to said first and second variables to be monitored and said first and second items to be controlled, said definition *data* for said configuration of said plurality of ports being selectively variable between said plurality of targets;
receiving data *to said network server* through a wireless network from said transceiver, interpreting said received data based on said definition data in said *common* database;
connecting to said *common* database *of said network server* through an Internet connection with a personal computer to receiver said interpreted data; and
sending control information from said personal computer through said Internet connection for transmission through said wireless network for selectively operating said first and second items to be controlled.

5. The method of claim [4]*3*, further comprising:
transmitting a message from a pager network to said transceiver,
receiving said message through said modem, and
executing a command responsive to said message wherein;
said control information is interpreted by said definition data in said *common* database prior to wireless transmission.

6. The method of claim [4]*3*, wherein:
said definition data includes the meaning of said first and second items to be controlled, which meaning selectively varies between said plurality of targets.

7. The method of claim [4]*3*, wherein:
said plurality of targets comprise a plurality of vehicles and said first and second variables comprise variables related to vehicles which are selectively different for said plurality of vehicles.

11. The method of claim 10, further comprising:
receiving said global position message through a wireless network, and
saving said global position message in said *common* database.

12. The method of claim 3, further comprising:
providing for remote access to said *common* database through said Internet connection by each of a plurality of different subscribers, each said subscriber being able to communicate only with targets for which each respective subscriber is authorized but not for other of said plurality of targets.

15. A monitoring system for monitoring a plurality of targets on behalf of a plurality of clients, each of said clients being associated with one or more of said plurality of targets, comprising:

a computer network server operable for communicating with a plurality of client computers through an Internet connection;

a *common* database *of said computer network server* operable for storing information relating to each of said plurality of targets; a wireless network system, said computer network server being in communication with said wireless network system; [and]

a plurality of wireless communication units for said plurality of targets, each of said plurality of wireless communication units being operable for communication with said wireless network *system*, each of said plurality of wireless communication units including a global position sensor to provide location information for each of said plurality of targets, said computer network server permitting each of said plurality of client computers to selectively communicate only with said one or more of said plurality of targets with which said client is associated such that each of said plurality of client computers is operable for sending a message to request said location information relating to said one or more of said plurality of targets with which said client is associated;

*said plurality of wireless communication units each comprising a selectable port wiring interface for selective wiring of each of said plurality of wireless communication units to said plurality of targets whereby one or more inputs to said wireless communication unit are operable for monitoring by a respective of said plurality of client computers and one or more outputs for said wireless communication unit are operable to be controlled by said respective of said plurality of client computers and;*

*said common database being configured for storing definition information for said plurality of wireless communication units comprising definitions of said one or more inputs to be controlled, said one or more outputs to be controlled and said selective wiring of said selectable port wiring interface for said plurality of wireless communication units;*

*a controller at said wireless communication unit for operating said wireless communication unit, said controller having a memory for programming said controller for operating said wireless communication unit; and*

*said plurality of wireless communication units comprising a modem for encoding said location information, said wireless network system comprising a wireless communication network system, said modem of said wireless communication unit being operable for a task, of sending messages comprising said location information through said wireless communication network system, whereupon said information is stored in said common database.*

16. The monitoring system of claim 15, wherein:

each of said targets has one or more electrically controllable elements controllable by said respective client computers through said computer network server and said wireless network *system*.

20. The monitoring system of claim 15, wherein:

said *common* database comprising a list of ingoing and outgoing messages.

22. The monitoring system of claim 15, further comprising:

at least a portion of said plurality of targets being a plurality of transport vessels, a wireless network system for communicating with said plurality of transport vessels, and said *common* database being operable for storing vessel location information.

23. The monitoring system of claim 15, further comprising:

a two-way pager operable for contacting one or more of said plurality of wireless communication units through said wireless network *system*.

24. The monitoring system of claim 15, further comprising:

*said controller is* a microcontroller for operating said wireless communication unit, said microcontroller having [a] *said* memory for programming said microcontroller for operating said wireless unit, said microcontroller comprising a computer and said memory within a single integrated circuit.

26. The monitoring system of claim 24, further comprising:

said plurality of client computers are each operable for communicating with said computer network server relating to [said] electrical signals for said one or more of said plurality of targets with which said client is associated.

27. The monitoring system of claim 26, further comprising:

at least a portion of said plurality of targets are vehicles, each vehicle having an electrical system connected to [said] *a* target interface, said plurality of client computers being operable for sending [an] *said* electrical signal to said electrical system of said vehicle through said target interface for said one or more of said plurality of targets with which said client is associated.

28. The monitoring system of claim 26, further comprising:

at least a portion of said plurality of targets are vehicles, each vehicle having an electrical system connected to *a* target interface, said plurality of client computers being operable for detecting an electrical signal from said vehicle through said target interface, said wireless network system, and said computer network server in accordance with a description for each said target interface stored within said *common* database.

29. A monitoring system operable for monitoring a plurality of targets on behalf of a plurality of users, each of said users being associated with one or more of said plurality of targets, comprising:

a computer network server operable for communicating with a plurality of client computers;

a *common* database *of said computer network server* operable for storing information relating to each of said plurality of targets;

a plurality of wireless communication units, a respective of said plurality of wireless communication units associated with said plurality of targets, each of said plurality of wireless communication units including a position sensor to provide location information for each of said plurality of targets;

a wireless network system operable for communicating wirelessly with a plurality of wireless communication units, said computer network server being in communication with said wireless network system, each of said plurality of wireless communication units being operable for communication with said wireless network system[,];

each wireless communication unit comprising a transceiver for two-way communication with said wireless network system related to a plurality of [control] inputs *to be monitored* and [said] *a* plurality of [status] outputs *to be controlled* of said target, *a plurality of ports for selective wiring of inputs to be monitored and said outputs to be controlled between said wireless communication unit and said target;*

*wherein said common database comprises definitions of said inputs to be monitored, said outputs to be controlled and said selective wiring of said plurality of ports;* each of said plurality of client computers being operable for requesting said computer network server to provide location information relating to said one or more of said plurality of targets with which said client is associated, said computer network server preventing communication with said plurality of targets with which said client is not associated;

a controller at said wireless communication unit for operating said wireless communication unit, said controller having a memory for programming said controller for operating said wireless communication unit; and each wireless communication unit comprising a pager modem for encoding said location information, said wireless network system comprising a pager wireless communication network system, said pager modem of said wireless communication unit being operable for *a task of* sending messages *comprising said location information* through, said pager wireless communication network system, *whereupon said information is stored in said common database.*

36. The monitoring system of claim [35]*29*, wherein:

[a plurality of said vehicles comprises] *said plurality of targets comprise a plurality of vehicles whereupon* one or more vehicles further comprise a door lock as [a control input] *an output to be controlled* such that each of said plurality of client computers is operable for selectively controlling said door lock of said plurality of vehicles with which said client is associated.

40. The monitoring system of claim 29, further comprising:

at least a portion of said plurality of targets being a plurality of transport vessels, said *common* database being operable for storing vessel location information.

44. The monitoring system of claim 29, further comprising:

at least a portion of said plurality of targets are vehicles, each vehicle having an electrical system connected to [said] *a* target interface, said plurality of client computers being operable for sending an electrical signal to said electrical system of said vehicle through said target interface for said one or more of said plurality of targets with which said client is associated.

45. The monitoring system of claim 29, further comprising:

at least a portion of said plurality of targets are vehicles, each vehicle having an electrical system connected to [said] *a* target interface, said plurality of client computers being operable for detecting an electrical signal from said vehicle through said target interface, said wireless network system, and said computer network server in accordance with a description for each said target interface stored within said *common* database.

46. The monitoring system of claim 15, *further comprising an Internet connection from said computer network server to said wireless communication network system, said computer network server being programmed to control messaging between said computer network server and said wireless communication network system.*

47. The monitoring system of claim 29, *further comprising an Internet connection from said computer network server to said wireless communication network system whereby said computer network server being programmed to control messaging between said computer network server and said pager wireless communication network system.*

*48. A monitoring system for monitoring a plurality of targets on behalf of a plurality of clients, each of said clients being associated with one or more of said plurality of targets, comprising:*

*a computer network server operable for communicating with a plurality of client computers through an Internet connection;*

*a common database of said computer network server operable for storing information relating to each of said plurality of targets; a wireless network system, said computer network server being in communication with said wireless network system;*

*a plurality of wireless communication units for said plurality of targets, each of said plurality of wireless communication units being operable for communication with said wireless network system, each of said plurality of wireless communication units including a global position sensor to provide location information for each of said plurality of targets, said computer network server permitting each of said plurality of client computers to selectively communicate only with said one or more plurality of targets with which said client is associated such that each of said plurality of client computers is operable for sending a message to request said location information relating to said one or more of said plurality of targets with which said client is associated;*

*said plurality of wireless communication units each comprising a selectable port wiring interface for selective wiring of each of said plurality of wireless communication units to said plurality of targets whereby one or more inputs to said wireless communication unit are operable for monitoring by a respective of said plurality of client computers and one or more outputs for said wireless communication unit are operable to be controlled by said respective of said plurality of client computers: and*

*said common database being configured for storing definition information for said plurality of wireless communication units comprising definitions of said one or more inputs to be controlled, said one or more outputs to be controlled and said selective wiring of said selectable port wiring interface for said plurality of wireless communication units.*

*49. The monitoring system of claim 48, wherein said one or more outputs to be controlled are controlled through a vehicle electrical system, wherein said vehicle electrical system comprises at least door locks, lights, and ignition.*

*50. The monitoring system of claim 48, further comprising: said wireless network comprising a pager wireless com-* munication network system, each of said wireless communication units comprising a pager modem for encoding said location information whereby said wireless communication unit is operable for a task of sending messages comprising said location information through said pager wireless communication network system, whereupon said information is stored in said common database.

51. The monitoring system of claim 48, wherein said one or more outputs to be controlled comprise a power control for said global position sensor, setting a flag in a memory to be operated on by a microcontroller, and controlling said microcontroller to send said location information.

* * * * *